Oct. 9, 1962 S. K. RUDORF 3,058,024
STRIP FEEDING MEANS
Filed Jan. 8, 1959 3 Sheets-Sheet 2

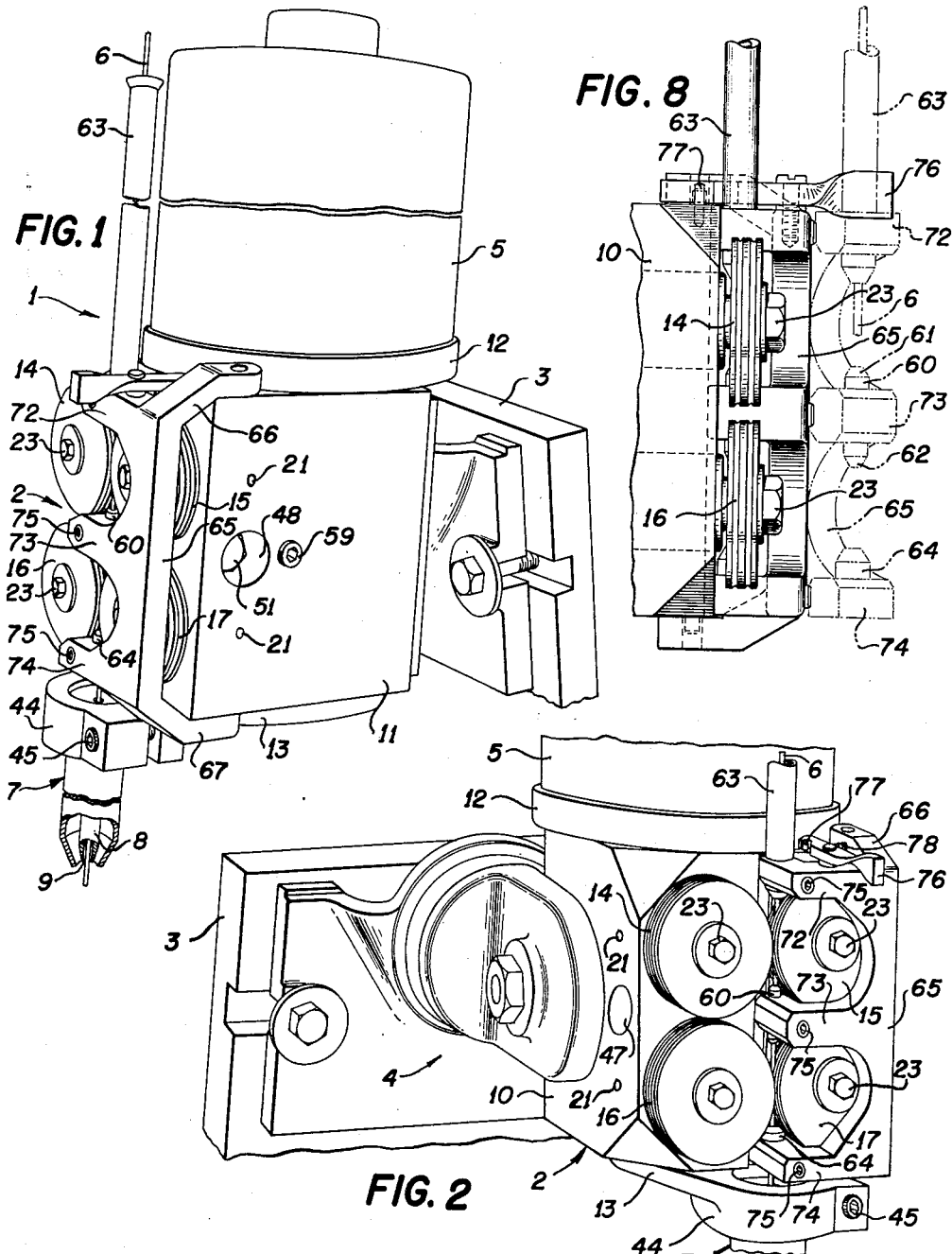

INVENTOR.
SIGURD K. RUDORF
BY
Andrus & Starke
Attorneys

Oct. 9, 1962 S. K. RUDORF 3,058,024
STRIP FEEDING MEANS
Filed Jan. 8, 1959 3 Sheets-Sheet 3
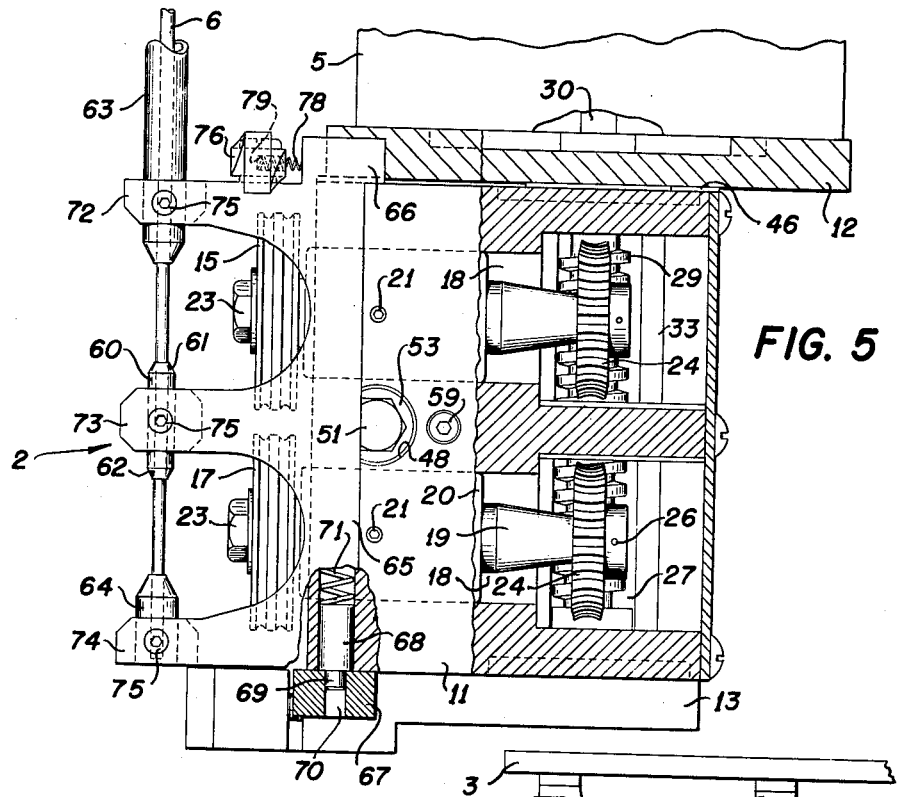
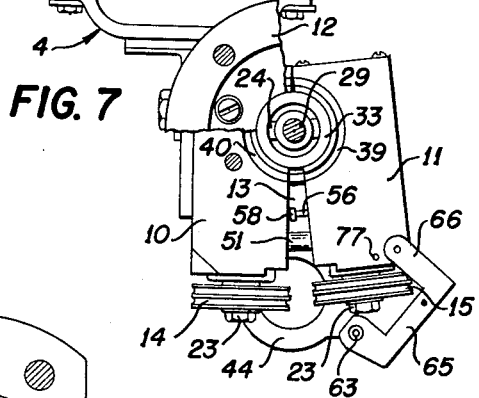
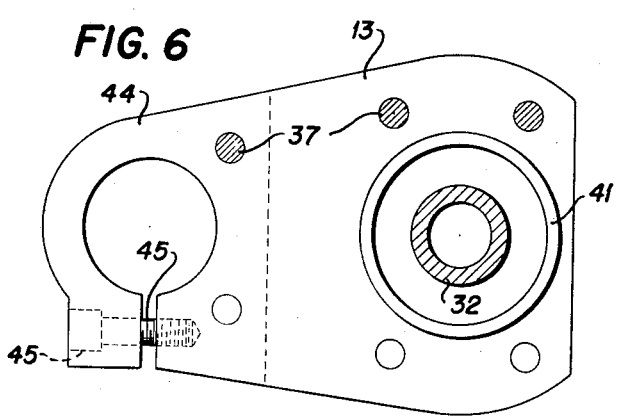
INVENTOR.
SIGURD K. RUDORF
BY
Andrus + Starke
Attorneys

United States Patent Office

3,058,024
Patented Oct. 9, 1962

3,058,024
STRIP FEEDING MEANS
Sigurd K. Rudorf, West Bend, Wis., assignor to A. O. Smith Corporation, Milwaukee, Wis., a corporation of New York
Filed Jan. 8, 1959, Ser. No. 785,611
15 Claims. (Cl. 314—78)

This invention relates to electrode feeding means and to a method of fabricating the housing of the feeding means and is particularly directed to a positive electrode drive mechanism for consumable welding electrodes.

Consumable-electrode arc welding processes employ a strip or rod-like electrode which is continuously withdrawn from a suitable supply and fed to the arc to maintain the arc and effect the desired welding operation. An arc welding head having an electrode directing nozzle portion and an electrode feed portion is conventionally employed to accurately locate the end of the electrode with respect to the work and to transport the electrode to the arc. The head and the work are movably mounted with respect to each other to allow progressive depositing of a weld on the work.

Drive means for the electrode are mounted on the weld head and connected through a suitable gear mechanism to an electric motor. The drive means conventionally comprises peripherally opposed drive wheels which are mounted to simultaneously frictionally engage the electrode. Some of the drive wheels are positively driven by a suitable motor or the like. The others are resiliently mounted for movement with respect to the positively driven wheels to establish resilient frictional engagement and drive of the electrode.

The electrode is guided from the drive wheels to the arc by a tubular electrical contact and guide member concentrically mounted within a nozzle which terminates closely adjacent to the arc. The arc is normally shielded from the surrounding air by a submerging granular, carbon dioxide gas blanket or by an essentially inert gas, such as argon and helium.

The welding arc establishes a certain amount of spatter of the molten weld metal, particularly where a carbon dioxide shielding gas is employed. Spatter which strikes the electrode and the electrode guide member tends to weld them together and interferes with a smooth continuous feed of the electrode.

Clearance is necessarily allowed between the electrode and the electrode guide member. Spatter has a tendency to enter therebetween and to jam the electrode within the electrode guide even if the spatter does weld the two together. Dirt which enters into the clearance generally also has a jamming effect.

In certain arc welding processes, the rate of electrode feed is generally quite low and the very slight interruptions in the electrode feed occasioned by the welding and jamming of the electrode with respect to the contact tube does not particularly interfere with the welding process. However, in the more recent submerged and gas shielded processes, relatively small diameter electrodes are rapidly fed to the arc and any slight or momentary interruption of the electrode feed adversely affects the characteristic of the weld.

The interruption in the electrode feed because of jamming or freezing of the electrode to the guide member can be eliminated by applying a greater driving force to the electrode. Thus, the number of opposed drive wheels mounted in cascade can be increased. However, the maintenance and initial cost of the welding head increases.

Further, the initial threading of the electrode through the drive wheels is time consuming and troublesome. As the number of drive wheels increase, the time to initially thread the electrode through the drive wheels also increases.

If both opposed drive wheels are positively driven, the driving force can be increased sufficiently to maintain essentially a constant feed rate. However, resiliently mounted wheels are necessary to accommodate variations in the size of the electrode used and to absorb shocks arising due to kinks and deflections in the electrode.

Welding heads are also normally side mounted and preferably are adapted to be mounted from either the right or the left side of the head. Present welding heads generally provide separate left and right mounting means for each mounting head. This increases the expense of the welding head.

The present invention provides a weld head construction which permits positive driving of all the feed wheels through a relatively simple gear system including resiliently mounted feed wheels to accommodate various sizes of electrodes.

In accordance with still another aspect of the present invention, an improved means for initially threading the electrodes through opposed electrode drive wheels or the like is provided.

Generally in accordance with the present invention, a pair of adjacent support members are provided to support opposed feed wheels. A drive member is mounted for rotation between the support members and is connected to the feed wheels by an inter-connecting drive mechanism in the corresponding support member to continuously and simultaneously drive the corresponding feed wheel or wheels.

The interconnecting mechanism includes a rotating member having a predetermined center to center spacing from the drive member, the mechanism is carried by one of the support members. The latter member is movably mounted to angularly position the rotating member about the drive member without changing the center to center spacing between the two members.

The supporting members are resiliently biased to a position engaging the peripheral surfaces of the opposed drive wheels. This provides a resilient frictional engagement of the electrode between positively opposed driven wheels.

The supporting members may be symmetrically formed about the driven member and reverse mounting of the welding head is then accomplished by merely inverting and reversing the position of the two supporting members.

Symmetrical supporting members of one form of the present invention are particularly adapted to a simple method of fabrication. A single block of metal is machined or cast to the desired configuration of the final head. The necessary openings for receiving the shafts, the mounting means and the like are machined into the single block. The block is then divided down the middle to provide the symmetrical mounting support members.

Relatively close mounting of the drive wheels to provide a compact welding head makes the initial threading of the electrode between the opposed drive wheels difficult and time consuming. This is particularly true where the drive wheels are mounted as a cascaded series of diametrically opposed pairs of wheels.

In accordance with another aspect of the present invention, a gate is provided with suitable guide means spaced in accordance with the entrance and exit to the opposed electrode drive wheels. The gate is releasably secured to the front of the welding head to dispose the guide means for the electrode between the pairs of cascaded opposed drive wheels. The gate and the attached drive means are moved to space the guide means from the drive wheels during the initial threading of the electrode. The electrode is then threaded through the individual guide means of the gate. Subsequently, the resiliently mounted drive wheels are separated from the relatively stationary drive wheels and the gate returned to the normal operating position. The electrode is consequently disposed between the opposed drive wheels and when the resiliently mounted drive wheels are released, the electrode is frictionally engaged between the periphery of the wheels.

The present invention provides a compact arc welding head for positively driving a consumable electrode to an arc. The welding head is relatively inexpensive and durable and is therefore adapted to mass production for commercial welding.

The drawings furnished herewith illustrate the best mode presently contemplated for carrying out the invention.

In the drawings:

FIGURE 1 is a perspective view of an arc welding head constructed in accordance with the present invention;

FIGURE 2 is a fragmentary perspective view of the arc welding head shown in FIGURE 1;

FIGURE 5 is a side view with parts broken away to show the inner construction of the welding head;

FIGURE 6 is an elevational view of a component cover plate of the arc welding head of FIGURES 1–5;

FIGURE 7 is a plan view with parts broken away illustrating the initial threading position of the welding head components;

FIGURE 8 is a fragmentary front view of the arc welding head showing the threading of the electrode through the electrode guide means.

Figure 3:
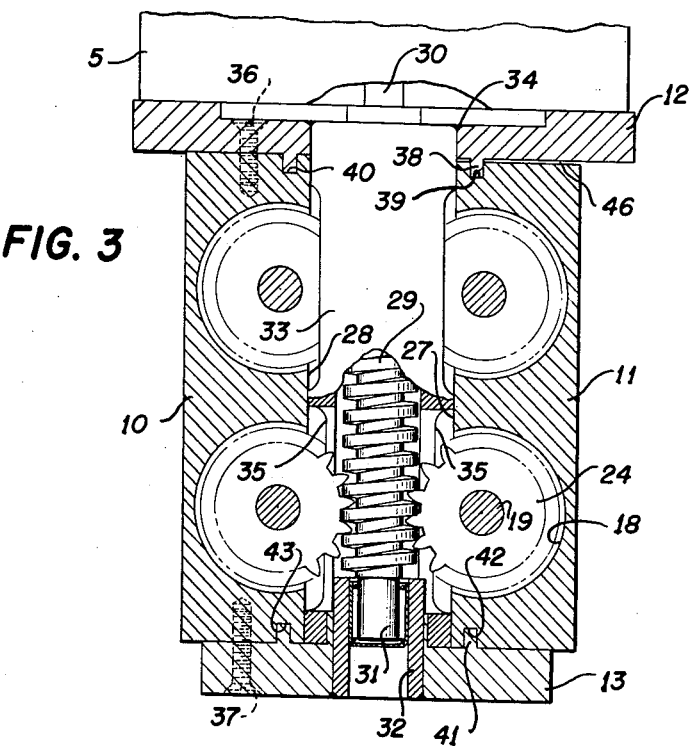
FIGURE 3 is a vertical section through the arc welding head shown in FIGURE 1.

Referring to the drawings and particularly to FIGURES 1 and 2, an arc welding head 1 is shown having a drive gear unit 2 which is adjustably mounted upon a stationary support 3 by a universal type support 4. A conventional drive motor 5, shown in elevation, is secured to the upper portion of the drive gear unit 2. The motor 5 operates the gear unit 2 to continuously withdraw an electrode 6 from a suitable supply reel, not shown, and to push the electrode through a welding nozzle 7 to an arc, not shown, during a welding operation.

The illustrated universal support 4 is any suitable type supporting mechanism which is adapted to be secured to the side of the arc welding drive gear unit 2 to rigidly and universally support the weld head 1 in predetermined positions for locating the nozzle 7 and electrode 6.

Drive motor 5 is any suitable type feed motor which creates sufficient output torque to positively drive the electrode 6 through nozzle 7.

A contact tube 8 is concentrically secured within the nozzle 7 and terminates immediately within the outer end of nozzle 7. The contact tube 8 is rigidly secured to a contact block, not shown, which connects the contact tube to a source of power, not shown, to supply current to the electrode 6. The contact tube passage 9 through which the electrode 6 passes is slightly larger than the diameter of the electrode 6 to permit ready passage of the electrode.

The drive gear unit 2 includes a pair of adjacent similar rectangular housing members 10 and 11 mounted between an upper support plate 12 and a lower support plate 13 with the longer dimension arranged in the vertical direction, as shown most clearly in FIGURES 1–3. Each housing member 10 and 11 rotatably supports one wheel of an upper pair of peripherally opposed drive wheels 14 and 15 and one wheel of a lower pair of peripherally opposed drive wheels 16 and 17. The opposed drive wheels 14 through 17 are biased to frictionally grasp the electrode 6 and are all positively driven to withdraw the electrode from the supply reel, not shown, and to propel the electrode 6 through welding nozzle 7 to the arc during the welding operation.

Figure 4:
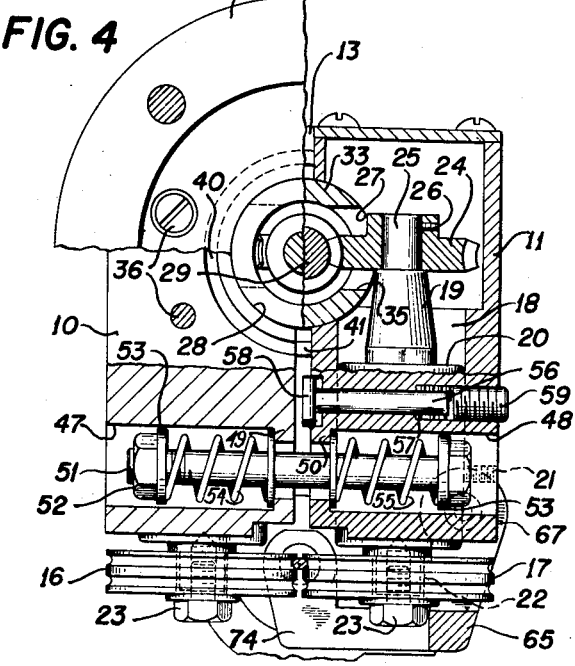
FIGURE 4 is a horizontal section through the arc welding head of FIGURE 1 with parts broken away to show the details of the welding head construction.

Referring to FIGURES 3–5, a gear system for the individual drive wheels 14 through 17 is shown. Each illustrated drive wheel 14–17 is similarly supported within the corresponding housing members 10 and 11 and driven by a corresponding gear system. Therefore, only one of the drive wheels and the corresponding supporting and drive gear system is described in detail. The other drive wheels are all similarly connected in a corresponding system and function substantially in the same manner during the operation of the arc welding head 1. The drive wheel 17, which is located at the lower portion of the housing member 11 in the drawings, is selected for a detailed description.

Referring particularly to FIGURES 3–5, the housing member 11 is provided with a shaft opening 18 which extends perpendicularly to the electrode movement and axially of the drive wheel 17. A driven shaft 19 is rotatably journaled within the shaft opening 18 by a ball bearing 20 which is immovably secured in the forward portion of the shaft opening. A small set screw 21 threads through a tapped opening in the side portion of the housing member 11 and securely locks the ball bearing 20 in place.

The forward end of the drive shaft 19 extends outwardly of the housing member 11 to receive drive wheel 17.

The forward end of shaft 19 is reduced in cross section as at 22 to correspond in size and shape to the mounting opening in the drive wheel 17. The depth of reduced shaft portion 22 is less than the thickness of the wheel 17 to establish a shoulder on the shaft 19 against which the wheel 17 is clamped. The drive wheel 17 is rigidly clamped to the shaft 19 by a washer and cap screw 23 which is threadedly secured within a suitable tapped opening in the outer end of the shaft.

The reduced shaft portion 22 may be made square or of any suitable configuration to positively lock the drive wheel 17 to the drive shaft 19 for simultaneous rotation of shaft and wheel.

The driven shaft 19 extends rearwardly through the housing 11 and terminates within an enlarged portion of opening 18.

A worm wheel 24 is secured to a reduced portion 25 on the back terminal end of the shaft 19 by set screw 26. The teeth of the worm wheel 24 pass through a vertically extending semi-circular recess 27 which is formed on the inner vertical wall of the housing member 11 and extends into the drive shaft opening 18. As shown, most clearly in FIGURES 3 and 4, the adjacent housing member 10 is formed with a similar recess 28 to define a worm receiving opening between the housing members 10 and 11. The axis of the opening is aligned with axis of the motor 5.

A worm 29 is rigidly attached at one end to the shaft 30 of motor 5 and is journaled in the opening formed by the cooperating recesses 27 and 28. The lower end of the worm 29 terminates in a bearing portion 31 which is journaled in a suitable radial and thrust bearing 32 in the bottom support plate 13. The worm 29 meshes with the individual worm wheels 24 for each of the drive wheels 14–17 to rotate the drive wheels incident to energization of motor 5.

A tubular worm guide 33 is rigidly secured within an opening in the top support plate 12 as by an encircling weld 34 and extends downwardly through the worm opening into engagement with the bottom support plate 13 encircling the bearing 32. A plurality of axially extending peripheral slots 35 are formed in the guide 33 in alignment with the worm wheels 24 to allow engagement of worm wheels 24 and the worm 29.

The bottom and top cover plates 12 and 13 are rigidly secured to the lower and upper surface of housing 10 by bolts 36 and 37.

The top cover plate 12 is generally a disc-like member which serves as a bottom closure for the drive motor 5 and overlies the upper surfaces of both the housing members 10 and 11.

A circular projection 38 depends from the under surface of the plate 12 concentrically about the worm guide 33 and worm 29. The projection 38 in the assembled position mates with correspondingly positioned grooves 39 and 40 in the upper surfaces of the respective housing members 10 and 11. The cooperating projection 38 and grooves 39 and 40 accurately radially locate the worm wheels 24 relative to the worm 29 and allow angular positioning of the housing member 11.

The bottom cover plate 13 overlies the inner lower portion or faces of the housing members 10 and 11. A circular projection 41 which conforms in size and shape to the depending projection 38 extends upwardly into correspondingly shaped grooves 42 and 43 in the lower surface of the housing members 10 and 11 and maintains accurate location of the worm wheels 24 relative to the worm 29.

The bottom plate 13 includes an integral C-clamp portion 44 having a set screw adjustment 45 to releasably secure the nozzle 7 in alignment with the electrode 6 as it leaves the drive wheels 16 and 17.

The housing member 11 is held in position by the top and bottom plate projections 38 and 41 and the cooperating grooves 39, 40, 42, and 43. Referring particularly to FIGURE 3, the housing member 11 is formed with a shorter vertical dimension than the housing member 10 to establish a slight clearance 46 between the upper surface of member 11 and the lower surface of the top support plate 12. The housing member 11 is consequently relatively free to move circumferentially about the axis of the worm 29.

The angular movement of member 11 does not interfere with the meshing of the worm 29 and the connecting worm wheels 24 because the movement merely repositions the worm wheels about the periphery of the worm and does not change the center to center relations between the worm and worm wheels. The vertical movement of the worm wheel teeth with respect to the worm thread does not affect the geometry of the gear relationship and consequently does not interfere with the operation of the gear train. Thus, housing member 11 may be resiliently mounted with respect to member 10 to resiliently mount the drive wheels 15 and 17 with respect to the drive wheels 14 and 16.

The housing member 11 is resiliently biased in the illustrated embodiment of the invention to dispose the drive wheels 15 and 17 carried by housing 11 into engagement with the opposed drive wheels 14 and 16 as follows.

Referring particularly to FIGURE 4, aligned transverse openings 47 and 48 are formed in the front portions of the housing members 10 and 11, respectively. Annular ledges 49 and 50 are integrally formed within the openings 47 and 48 at the mating or facing surfaces of the members 10 and 11 and partially close the openings. A single bolt 51 having a diameter less than the partially closed portion extends through the aligned openings 47 and 48 and a hex nut 52 is threaded onto the bolt to lock the bolt within the aligned openings. Bearing washers 53 are mounted on the bolt 51 adjacent the opposed ledges 49 and 50, the head of bolt 51 and the hex nut 52 to slidably support the bolt within the confines of the aligned openings. Coil springs 54 and 55 encircle the bolt 51 between the spaced bearing washers 53 and are compressed to establish a predetermined resilient mounting of housing member 11. The housing member 10 is relatively rigidly held by the universal support 4. The housing member 11 is free to pivot in the cooperating guide grooves 39 and 40 and the cooperating guides grooves 42 and 43 about the axis of worm 29. The springs 54 and 55 bias the housing member 11 and the attached drive wheels 15 and 17, in a clockwise direction as shown in FIGURE 4, to establish a resilient and frictional engagement of the electrode 6 between the opposed drive wheels. Energizing of motor 5 rotates the drive wheels and thus positively moves the electrode 6 through the nozzle 7.

The resilient pivotal mounting of housing 11 absorbs any lateral shock arising from deflection and bends in the electrode 6 and accommodates different size electrodes.

The cooperating worm 29 and worm wheel 24 permit relative pivotal movement of the worm wheel about the worm 29 without interference with the transmission of power to the drive wheels. Consequently, the resiliently mounted wheels 15 and 17 can be positively driven to increase the power applied to the electrode 6.

As previously noted, the electrode 6 may weld or jam to the contact tube 8. The positive driving force applied by all of the drive wheels 14 through 17 to the electrode 6 readily breaks the electrode 6 away from the contact tube 8 and establishes a smooth, continuous electrode feed.

During the initial threading of the electrode 6 downwardly through the opposed drive wheels, the housing member 11 is moved counter-clockwise, as viewed in FIGURES 4 and 7, to separate the opposed drive wheels. The illustrated embodiment of the invention includes a selectively positionable plunger 56 which is adapted to hold the housing member 11 in a threading position.

The manually adjustable plunger 56 is journaled within a lateral opening 57 in the forward portion of housing member 11. The inner end of the plunger 56 is formed with a piston-like head 58 which is adapted to engage the adjacent surface of the housing member 10. The outer portion of the plunger-receiving opening 57 is enlarged and tapped to receive a correspondingly threaded set screw 59.

To hold the forward portion of housing members 10 and 11 in spaced relation, the set screw 59 is threaded into the tapped opening 57 and forces the plunger 56 outwardly through the opening and into engagement with the housing member 10. The housing member 10 is held stationary by the universal support 4 and consequently the continued movement of the set screw 59 causes the housing member 11 to pivot about worm 29, in a counter-clockwise direction as viewed in FIGURES 4 and 7. The forward portions of the housing members 10 and 11 separate and the opposed peripheries of the drive wheels 14–17 are sufficiently spaced to allow the electrode 6 to be readily disposed therebetween, as shown in FIGURE 7.

The successive pairs of opposed drive wheels are vertically mounted in relatively closely spaced relation. However, because of the diameter of the drive wheels, a space exists between the discharge from the upper pair of drive wheels 14 and 15 and the lower pair of drive wheels 16 and 17. A tubular guide 60 is mounted within the space with the guide opening extending tangentially of said drive wheels. The guide 60 is formed with tapered ends 61 and 62 to allow relatively full enclosure of the free space between the successive pairs of drive wheels. Similarly, tubular electrode guides 63 and 64 are respectively mounted immediately adjacent the entrance to the upper pair of drive wheels 14 and 15 and the exit from the lower pair of drive wheels 16 and 17. The ends of the guides taper toward the corresponding drive wheels to support the electrode as it passes through the drive wheels to the nozzle 7.

Referring particularly to FIGURES 2 and 8, the location of electrode guides 60, 63, and 64 prevents convenient threading of the initial portion of the electrode 6 through the drive unit.

In accordance with another aspect of the present invention, the illustrated electrode guides 60, 63 and 64 are secured to a gate 65 which is pivotally mounted adjacent the outer portion of the housing member 11. The gate 65 is a vertically extending E-shaped member having an integral upper pivot arm 66 and an integral lower pivot arm 67 extending laterally therefrom. The pivot arms 66 and 67 terminate adjacent the upper and lower surfaces of the housing member 11 and are similarly pivotally joined to housing member 11 to dispose the main body of gate 65 in front of the drive wheels 15 and 17.

The pivotal connection for the lower pivot arm 67 is shown in section in FIGURE 5. A piston 68 is journaled within a corresponding diameter opening in the lower surface of the housing member 11. The outer portion of the piston 68 is reduced in cross section as at 69 and is adapted to engage a corresponding opening 70 in the pivot arm 67. A spring 71 is disposed between the base of the piston-receiving opening and the inner end of piston 68 and biases the piston outwardly to hold the reduced portion 69 in the opening 70 to pivotally support the gate 65. The three arms 72, 73 and 74 of the E-shaped gate 65 are vertically spaced in accordance with the positioning of the electrode guides 60, 63, and 64. Each arm 72–74 is generally L-shaped with a relatively long leg disposed in front of the adjacent drive wheels 15 and 17 and an integral short leg extending inwardly to support the electrode guides 60, 63, and 64. The short legs of the gate arms are apertured and the electrode guides are releasably secured within the apertures by set screws 75 to rigidly support the electrode guides.

Referring particularly to FIGS. 2 and 5, a latch lever 76 is pivotally secured to the upper lateral arm 72 and is adapted to selectively engage a latch pin 77 on the housing member 11 to releasably hold the gate 65 in operating position. The lever 76 is pivotally secured to the upper surface of the upper gate arm 72 and extends horizontally parallel to the lateral pivot arm 66. A coil spring 78 is disposed between lever 76 and pivot arm 66 and secured at one end to the arm 66. The opposite end of spring 78 protrudes into a recess 79 in the latch lever 76. The force of coil spring 78 positively holds the latch lever 76 in engagement with latch pin 77 to prevent movement of the gate 65. The gate 65 is released by positively pivoting the latch lever 76 to further compress the coil spring 78 and disengage the outer end of latch lever 76 from latch pin 77 which allows manual pivoting of the gate to an open position, as shown in full line in FIGURES 5 and 7 and in phontom in FIGURE 8.

Referring particularly to FIGURES 5, 7 and 8, the opening of gate 65, as shown, allows easy and rapid threading of the electrode 6 downwardly through the respective electrode guides 60, 63, and 64. As shown in FIGURE 5, the initial threading of the electrode 6 is terminated within the exit guide 64 to allow movement of the unit over the nozzle clamp 44.

Before returning the gate 65 and electrode 6 to the normal operating position, the set screw 59 is threaded into the tapered opening 57 in housing member 11. The plunger 56 is thus moved into engagement with the relatively immovable housing member 10 to pivot housing member 11. The forward portion of housing member 11 moves away from housing member 10 and separates the adjacent peripheries of the opposed drive wheels 14–17. The gate 65 with the electrode 6 threaded therethrough is returned to the normal position and the electrode 6 is disposed between the peripheral surfaces of the opposed positively spaced drive wheels 14–17. The latch lever 76 engages pin 77 and the spring 78 positively locks the gate 65 in place. The set screw 59 is released and housing member 11 moves forwardly to establish a resilient, frictional engagement of the electrode 6 by the opposed drive wheels, as previously described.

The housing members 10 and 11 are generally symmetrical about a vertical plane extending downwardly between the adjacent members 10 and 11. Therefore, to convert from the illustrated left hand mount to a right hand mount, not shown, the housing members 10 and 11 may be disassembled with respect to the cover plates 12 and 13, inverted and reversely positioned between the cover plates 12 and 13.

The illustrated upper drive wheels 14 and 15 become the lower drive and the illustrated lower drive wheels 16 and 17 become the upper drive wheels. The housing member 10 is then on the right, as viewed from the front of the unit, and the head is positioned for a right hand mount. The housing member 11 is on the left and resiliently supported between the support plates 12 and 13.

In reversing and inverting the position of the housing member 11, the gate 65 is also inverted and the electrode guides are out of position.

The gate 65 is removed by depressing the supporting pins 69 and reversed to dispose the electrode guides to the corresponding position shown in the illustrated left hand mount position of the welding head.

The housing members 10 and 11 may be formed in any suitable manner such as by casting and suitable machining.

Figure 9:
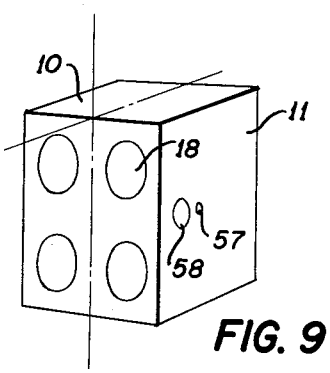
FIGURE 9 is a perspective view of the weld head housing in the process of fabrication in accordance with one aspect of the present invention.

A particularly simple construction starts with a solid square block 79 generally corresponding to the combined shape of the housing members 10 and 11, as shown in FIGURE 9. The necessary openings 18 for the drive wheel shafts 19, the opening 58 for the resilient biasing rod 51, opening 57 for plunger 56 and the like are formed in the square block as shown in FIGURE 9. The block is then divided vertically with the two portions forming housing members 10 and 11. The portion corresponding to housing 11 is machined to reduce the vertical depth thereof and to establish the space 46 in the assembled welding head.

The various openings are rapidly and easily formed and the necessity for special machining is avoided. Consequently, the construction is particularly adapted to mass production of welding head.

The drive wheels may be vertically staggered although the directly opposed drive wheels provided a more positive drive.

The present invention provides a relatively simple and compact drive mechanism for positively driving resiliently mounted electrode drive wheels while maintaining a resilient frictional engagement with the electrode.

The gate-mounted electrode guides allow ready threading of the electrode into operating position and thus provide a simply and conveniently controlled weld head for shop operations.

Various modes of carrying out the invention are contemplated as being within the scope of the following claims, particularly pointing out and distinctly claiming the subject matter which is regarded as the invention.

I claim:

1. In an arc welding head for feeding an electrode to an arc, first and second supporting members, a first rotating drive gear independently mounted between said supporting members, a second rotating gear rotatably mounted on the first supporting member in mesh with said first drive gear, a pair of drive wheels carried one each by said supporting members, means coupling the corresponding wheel to the second rotating gear, means to movably mount said first supporting member for pivotal movement of the second gear about the true axis of said first gear to maintain constant predetermined gear center spacing, and biasing means associated with the first supporting means and biasing said wheels into engagement with the electrode.

2. In an arc welding head for feeding an electrode to an arc, a plurality of electrode drive wheels resiliently mounted in opposed relation and adapted to resiliently engage the electrode to transport the electrode to the arc, drive shafts for said drive wheels, a prime mover, a first relatively stationary rotating member adapted to be connected to said prime mover, and a second rotating member mounted with said drive wheels and positioned adjacent the first rotating member, said second member being rotatable about an axis perpendicularly related to the axis of the stationary rotating member and being connected in direct driven relation to said stationary rotating member whereby said second member is adapted to maintain the driving engagement incident to movement about said stationary rotating member.

3. In an arc welding head for welding with a consumable electrode, a power driven worm, supporting members mounted on the opposite sides of the worm, at least one of said supporting members being resiliently supported for relative movement about the worm, a plurality of worm gears rotatably carried by said members in operative engagement with said driven worm, a plurality of electrode drive wheels rotatably carried by said members in opposed relation and adapted to engage and transport the electrode, and connecting means carried by said supporting members and operatively joining said worm gears and said drive wheels to positively drive the opposed drive wheels.

4. An arc welding head, which comprises a pair of housing members having cooperating recessed surfaces defining an opening, a worm extending into said opening defined by said housing members, a support for said housing members, means to mount one of said housing members upon said support, means to mount the other of said housing members for angular movement about the axis of said worm, resilient means biasing said movable housing member to a preselected angular position, shafts extending perpendicularly to said opening, worm gears secured to said shafts adjacent said opening and adapted to engage the worm, and drive wheels secured to the extended ends of said shafts and resiliently biased toward each other by said resilient means.

5. An arc welding head for feeding a consumable electrode to an arc, which comprises a pair of housing members having cooperating surfaces defining a generally tubular opening, a support for said housing members, means to mount one of said housing members on said support, means to mount the other of said housing members on said support for angular movement about the axis of said opening, a worm extending into the opening between said members, a plurality of shafts rotatably mounted in said housing member perpendicular to said opening and extending forwardly of the housing members, worm gears secured to said shafts adjacent said opening in mesh with said worm, drive wheels releasably secured to the forward ends of said shafts, and biasing means operatively associated with said housing members and tending to move the forward portion of the movable housing member toward the forward portion of the stationary housing member.

6. An arc welding head, which comprises a pair of housing members having cooperating surfaces defining a drive shaft receiving opening, a support for said housings, means to mount one of said housing members on said support, means to mount the other of said housing members on said support for angular movement about the axis of said opening, a worm extending into the opening between said members, a plurality of shafts rotatably mounted in said housing members perpendicularly to said opening and extending forwardly of the housing members, worm gears secured to said shafts adjacent said opening in mesh with said worm, drive wheels secured to the forward ends of said shafts, a rod secured within aligned openings in the forward portion of said housing members, and stressed resilient means encircling said rod and reacting on the movable housing member to bias the forward portion of the movable housing member toward the forward portion of the stationary housing member.

7. An arc welding head, which comprises a pair of similar housing members having cooperating surfaces defining a cylindrical opening, a support for said housings, means to mount one of said housing members on said support, means to mount the other of said housing members on said support for angular movement about the axis of said opening, a worm extending into the cylindrical opening between said members, a plurality of shafts rotatably mounted in said housing members perpendicularly to said opening and extending forwardly of the housing members, worm gears secured to said shafts adjacent said opening in mesh with said worm, drive wheels secured to the forward ends of said shafts, a rod extending laterally of said shafts and into aligned tubular openings in the forward portions of said housing members, shoulders partially closing said adjacent ends of said openings, and stressed spring means encircling said rod within each of said recesses and having one end bearing upon said shoulder and the opposite end operatively secured to the rod within the recess and in spaced relation to said shoulder.

8. An arc welding head which comprises a pair of housing members having cooperating surfaces defining a worm receiving opening, a support for said housings, means to mount one of said housing members on said support, means to mount the other of said housing members on said support for angular movement about the axis of said opening, a worm extending into the opening between said members, a plurality of shafts rotatably mounted in said housing members perpendicularly to said opening and extending forwardly of the housing members, worm gears secured to said shafts adjacent said opening in mesh with said worm, drive wheels secured to the forward ends of said shafts, resilient means acting on the movable housing member to bias the forward portion of said angularly movable housing member toward the forward portion of the other housing member, and adjustable means mounted on one of said housing members and adapted to selectively engage the other of said housing members to positively hold the forward portions of said housing members in angularly spaced relation.

9. An arc welding head, which comprises a pair of housing members having cooperating surfaces defining a worm receiving opening, a support for said housings, means to mount one of said housing members on said support, means to mount the other of said housing members on said support for angular movement about the axis of said opening, a worm extending into the opening between said members, a plurality of shafts rotatably mounted in said housing members perpendicularly to said opening and extending forwardly of the housing members, worm gears secured to said shafts adjacent said opening in mesh with said worm, drive wheels secured to the forward ends of said shafts, a rod extending laterally of said shafts and into aligned tubular recesses in the forward portions of said housing members, shoulders partially closing said adjacent ends of said recesses, stressed spring means encircling said rod within each of said recesses and having one end bearing upon said shoulder and the opposite end secured to the rod within the recess and in spaced relation to said shoulder, a rod journaled in a lateral opening in one of said housing members and adapted to move outwardly into bearing engagement with the other of said housing members, an externally operable means adjustably secured behind said rod to selectively position said rod into bearing engagement to positively hold the forward portions of said housing members in angularly spaced relation for initially locating the electrode between opposed guide rolls.

10. In an arc welding head, which comprises a pair of rectangularly shaped casing members mounted in slightly spaced side-by-side relation and having a vertical worm-receiving opening therebetween, a driven worm rotatably mounted within said opening, support means, one of said members having a greater length in the direction of said worm receiving space and being adjustably mounted on said support means, a pair of support brackets secured to opposite ends of said last named casing member and having bearing surfaces extending laterally over the worm receiving opening and the other casing member, cooperating surfaces on said bearing surfaces and the adjacent short casing member to support the casing member for angular movement about the axis of the worm receiving space, spaced and aligned shafts rotatably mounted at least one in each of said casing members perpendicularly to said worm receiving opening, worm gears secured to said shafts and arranged in mesh with said worm, drive wheels secured to said shafts to establish a pair of opposed electrode gripping drive wheels, and biasing means operatively associated with the casing members to bias the drive wheels toward each other to tightly grip an electrode disposed therebetween.

11. An arc welding head, which comprises a pair of rectangularly shaped casing members mounted in slightly spaced side-by-side relation and having a worm-receiving opening therebetween, a driven worm rotatably mounted within said opening, support means, means adjustably mounting one of said members on said support means, support members extending laterally from opposite ends of the adjustably mounted casing member and over the other casing member, cooperating circular grooves and projections on said support members and the encompassed casing member to support the encompassed casing member for angular movement about the worm receiving opening, shafts rotatably mounted in each of said casing members perpendicularly to said worm receiving opening and extending forwardly as said casing members, worm gears secured to said shafts in mesh with said worm, opposed drive wheels secured to the extended ends of said shafts, and resilient biasing means operatively associated with casing members to bias the drive wheels toward each other to resiliently frictionally grip a consumable electrode therebetween.

12. An arc welding head, which comprises a pair of rectangularly shaped casing members mounted in slightly spaced side-by-side relation and having a worm-receiving opening therebetween, a driven worm rotatably mounted within said opening, support means, means adjustably mounting one of said members on said support means, support members extending laterally from opposite ends of the adjustably mounted casing member and over the other casing member, cooperating surfaces on the facing surfaces of said extended support members and the last named casing member to support the encompassed casing member for angular movement about the worm receiving opening, shafts rotatably mounted in each of said casing members perpendicularly to said worm receiving opening and extending forwardly of said casing members, worm gears secured to said shafts in mesh with said worm, opposed drive wheels secured to the extended ends of said shafts, and resilent biasing means operatively associated with casing members to bias the drive wheels toward each other to resiliently frictionally grip a consumable electrode therebetween.

13. An arc welding head, which comprises a pair of similar housing members having cooperating adjacent surfaces defining a cylindrical opening, means to support said housing members with at least one of said housing members being adapted to angularly move about the axis of said cylindrical opening, a worm rotatably mounted within said opening, driven shafts rotatably journaled within said housing members and terminating in alignment with said opening, worm gears secured to the terminal ends of said driven shaft and meshing with said worm, corresponding driven shafts being aligned with each other, drive wheels secured to the ends of said driven shafts, resilient means operatively engaging said housing members to bias the portion of the housing members adjacent the drive wheels together to establish a resilient drive engagement of an electrode, adjustable positioning means mounted on one of said housing members and adapted to engage the opposite housing members to move and hold said housing members against said biasing means and to space said drive wheels, an electrode guide means releasably mounted on said housing members to positively direct the electrode through the cascaded drive wheels and to allow ready initial positioning of an electrode between the drive wheels.

14. An electrode guide mechanism for directing an electrode between cascaded pairs of opposed feed wheels of an arc welding head, which comprises tubular guides adapted to be substantially tangentially disposed adjacent the electrode gripping surfaces of said feed wheels in alignment with the electrode, and a gate movably secured to the arc welding head and having means to support said tubular guide to selectively position said tubular guide in position adjacent the feed wheels and in spaced relation to said feed wheels for ready threading of an electrode through the guide means.

15. An electrode guide unit for directing an electrode between cascaded pairs of resiliently opposed feed wheels of an arc welding head, which comprises tubular guides adapted to be mounted with electrode guide passages immediately adjacent the entrance and discharge end of the electrode gripping surfaces of said feed wheels and extending between adjacent pairs of feed wheels, a gate adapted to be pivotally secured to the arc welding head and having support arms secured to the tubular guide to support said tubular guide, and releasable latch means secured to said gate and to said welding head to releasably hold said gate in a position disposing said electrode guides and adjacent said feed wheels.

References Cited in the file of this patent
UNITED STATES PATENTS
2,788,463   Kennedy _____ Apr. 9, 1957